United States Patent [19]

Flamand

[11] 3,973,716

[45] Aug. 10, 1976

[54] PROCESS FOR MAKING A PIECE OF HOLLOW JEWELLERY

[75] Inventor: Paul Flamand, Garat-Dignac, France

[73] Assignee: Flamor S.A., Angouleme, France

[22] Filed: Dec. 31, 1974

[21] Appl. No.: 537,834

Related U.S. Application Data

[63] Continuation-in-part of Ser. No. 460,039, April 11, 1974, abandoned.

[30] Foreign Application Priority Data

Feb. 20, 1974 France .............................. 74.05676
Dec. 24, 1974 France .............................. 74.42625

[52] U.S. Cl. ............................. 228/118; 219/9.5; 228/190; 228/223; 228/245
[51] Int. Cl.² ........................................... B23K 1/04
[58] Field of Search .... 228/263, 118, 238, 204–207, 228/190; 29/160.6; 148/26; 219/8.5

[56] References Cited

UNITED STATES PATENTS

| | | | |
|---|---|---|---|
| 440,847 | 11/1890 | Meyer .............................. | 228/118 |
| 921,722 | 5/1909 | Meyer .............................. | 29/160.6 |
| 1,001,669 | 8/1911 | Monnot ........................... | 228/263 X |
| 2,273,609 | 2/1942 | Wrighton et al. ................ | 219/9.5 |
| 2,284,504 | 5/1942 | Wrighton et al. ................ | 219/9.5 |
| 2,357,014 | 8/1944 | Merlub-Sobel ................... | 148/26 |
| 2,369,537 | 2/1945 | Crawford ......................... | 228/204 |
| 2,423,811 | 7/1947 | Goulding ......................... | 228/118 X |
| 3,693,246 | 9/1972 | Novikov et al. .................. | 228/263 |

*Primary Examiner*—Al Lawrence Smith
*Assistant Examiner*—K. J. Ramsey
*Attorney, Agent, or Firm*—Fisher, Christen & Sabol

[57] ABSTRACT

A process for producing hollow gold jewellery. A temporary substrate of soft iron is plated with precious metal leaf. A strip cut form a bimetallic plate thus plated is drawn, with incorporation of a temporary soft-iron core, to a precious metal covered wire, which can be fabricated into hollow pieces of jewellery, the soft iron being eliminated by an aqueous solution of $H_2SO_4$.

6 Claims, No Drawings

PROCESS FOR MAKING A PIECE OF HOLLOW JEWELLERY

This application is a continuation-in-part of my co-pending application Ser. No. 460,039, filed Apr. 11, 1974 for Process For Gold Plating, and Manufacture of Hollow Jewellery, now abandoned.

BACKGROUND OF THE INVENTION

1. Field of the Invention

This invention relates to materials for the manufacture of hollow jewellery from precious metal as gold or silver, and to methods of making such materials.

2. Description of the Prior Art

At present, hollow pieces of jewellery with a purity of 18 carats (750 mil.) can be obtained by plating brass sheet with gold leaf, drawing strands cut from a composite sheet thus plated on a brass core, forming pieces of jewellery from the strands obtained, and eliminating the brass with nitric acid.

It has been found that a process of this kind cannot be used for manufacturing pieces of hollow jewellery of low purity, for example 9 carats, because the nitric acid attacks such alloys.

Attempts have been made to use temporary substrates made of metals which undergo little or no oxidation under the plating conditions, such as aluminium. Unfortunately, the results obtained have not been satisfactory.

SUMMARY OF THE INVENTION

It has now been found that temporary substrates made of soft iron are suitable for use in the manufacture of hollow jewellery (gold or silver), providing certain precautions are taken. This discovery is the more surprising insofar as soft iron is known to oxidise very easily, and therefor unfit to be plated.

DESCRIPTION OF THE PREFERRED EMBODIMENTS

The plating process according to the invention is described in the following.

A sheet of soft iron is to be plated with gold or silver leaf under the most rigorous conditions.

In the context of the invention, soft iron is a substantially pure iron, for example a grade E24 (A37) iron of French Standard A35-501.

The surfaces of the gold or silver leaf and soft-iron sheet to be brought into contact with one another are cleaned, such as by rubbing with emery cloth, leaving the surfaces as clean as possible.

Each of the cleaned surfaces is then coated around its periphery with a slurry or aqueous paste of an anti-oxidising, pickling powder which does not swell under heat, for example a pickling powder consisting essentially of a mixture of alkali metal fluoborate and boric acid (for example the pickling powder known as Castolin No. 1802).

After the cleaned surfaces thus prepared have been brought into contact with one another, a thin strip of solder with a low bond temperature and a high silver content (for example a Castolin No. 1082 solder) is applied to the ends of the plates.

Several sets of gold (or silver) iron plates thus prepared are then stacked one on top of the other, with a plate of garlic-coated oxidised steel between each set. The stack of plates is then secured by fastening the two end steel plates, as for example with tightening screws or any other suitable device.

The pack thus formed is then wrapped in copper foil.

The package is then heated, advantageously to a maximum temperature of 850° to 900°C during 45 minutes for gold/iron plates or 870° to 880°C during 55 minutes for silver/iron plates, for example in a furnace or by induction heating.

The package is then placed at these temperatures between the plates of a hydraulic press under an initial pressure of 30 tons, reduced over a period to 5 tons.

Where the package is heated by induction, heating takes place in the press itself.

The package is cooled, such as by immersion in water. Each set of bimetallic gold (or silver)/iron plates is then rolled conventionally by successive passes with intermediate annealing to a thickness of 7/10ths of a millimeter. Each rolled bimetallic plate is cut into strips which are then drawn as follows: each strip is bent into the shape of a letter U, inside which is placed a soft-iron core (of the same quality as for the initial plates), made into a point in known manner, the point is introduced into a drawplate and then the resulting composite is drawn.

The strands thus obtained are coiled in known manner and are ready for use for the manufacture of jewellery.

When the pieces of jewellery are in their final form, the soft iron forming the initial substrate and the soft iron forming the core of the strand are both eliminated, most advantageously by using an aqueous solution at 70°C containing 5 % by weight of ordinary, 65/66° Baume sulphuric acid.

The dissolution rate is equivalent to about 2 microns for every 10 minutes in the bath. Continuous stirring is required to eliminate iron sulphide FeS and the metal sulphides attributable to the impurities, which have to escape from the hollow body through the "longitudinal slot".

The process described above can be used to manufacture pieces of jewellery in 9 carat gold or in silver with as perfect a finish as pieces of jewellery made of purer gold without any greater technological difficulties than those normally accepted today.

I claim:

1. A process for producing a plate for use in the manufacture of hollow jewellery wherein a sheet of gold or silver having a cleaned surface is to be bonded to a sheet of iron having a cleaned surface, comprising the steps of:
   a. applying a pickling, antioxidising product to the peripheral area of said cleaned surface of the sheet of gold or silver and to the peripheral area of said cleaned surface of the sheet of iron to prevent oxidation during further treatment;
   b. bringing the cleaned surfaces of the gold or silver sheet into contact with the surface of the sheet of iron;
   c. applying a strip of solder to the ends of the two sheets;
   d. applying heat and pressure to said two sheets to form said plate.

2. A process as claimed in claim 1, wherein said pickling antioxidising product is an aqueous solution of an alkali metal fluoborate.

3. A process as claimed in claim 2, wherein the pickling product consists essentially of alkali metal fluoborate and boric acid and is used for preparing both the faces of said sheets and the peripheral zones.

4. A process for producing a plate for use in the manufacture of hollow jewellery wherein a sheet of precious metal is to be bonded to a sheet of iron comprising the steps of:
   a. cleaning at least one surface of a sheet of precious metal and at least one surface of a sheet of iron;
   b. applying a pickling, antioxidising product to the peripheral areas of said cleaned surfaces of the sheet of precious metal and the sheet of iron and applying solder to the ends of the cleaned surfaces of the sheet of precious metal and sheet of iron;
   c. forming a stack by sandwiching at least one set of two precious metal and iron sheets between plates of garlic-coated, oxidised steel, one of said steel plates being introduced between each of said sets of sheets and with one of said steel plates at each end of the stack;
   d. subjecting said stack to heavy pressure and heating by induction;
   e. maintaining said stack at a temperature of at least about 800°C for at least about 40 minutes;
   f. decreasing the amount of said pressure as said heating is continued.

5. A process as claimed in claim 4, wherein the stack of gold and iron plates is wrapped in copper foil, heated to a temperature of from about 800° to about 900°C for at least about 45 minutes and is then subjected, thus heated, to a plating pressure which is subsequently reduced below its initial level.

6. A process as claimed in claim 4 wherein the stack of silver and iron plates is wrapped in copper foil, heated to a temperature of from 870° to about 880°C for at least about 55 minutes and is then subjected, thus heated, to a plating pressure which is subsequently reduced below its initial level.

* * * * *